United States Patent
Ohtani et al.

(10) Patent No.: US 12,288,037 B2
(45) Date of Patent: Apr. 29, 2025

(54) RECIPE TRANSLATION SERVER AND CONTROL METHOD FOR RECIPE TRANSLATION SYSTEM

(71) Applicant: Cookpad Inc., Tokyo (JP)

(72) Inventors: Shinya Ohtani, Tokyo (JP); Masayuki Ioki, Tokyo (JP); Akihisa Kaneko, Tokyo (JP); Tomomichi Sumi, Tokyo (JP); Jun Harashima, Tokyo (JP)

(73) Assignee: COOKPAD INC., Tokyo (JP)

( * ) Notice: Subject to any disclaimer, the term of this patent is extended or adjusted under 35 U.S.C. 154(b) by 584 days.

(21) Appl. No.: 17/352,364

(22) Filed: Jun. 21, 2021

(65) Prior Publication Data

US 2021/0312142 A1 Oct. 7, 2021

Related U.S. Application Data

(63) Continuation of application No. PCT/JP2018/047657, filed on Dec. 25, 2018.

(51) Int. Cl.
*G06F 40/47* (2020.01)
*G06F 40/30* (2020.01)
(Continued)

(52) U.S. Cl.
CPC .............. *G06F 40/47* (2020.01); *G06F 40/30* (2020.01); *G06F 40/51* (2020.01); *G06F 40/56* (2020.01); *G06F 40/58* (2020.01)

(58) Field of Classification Search
CPC .......... G06F 40/47; G06F 40/30; G06F 40/51; G06F 40/56; G06F 40/58; G06F 40/55
See application file for complete search history.

(56) References Cited

U.S. PATENT DOCUMENTS

2009/0132233 A1* 5/2009 Etzioni ............... G06F 16/3332
   707/E17.073
2012/0123765 A1* 5/2012 Estelle ................. G06F 40/284
   704/E13.011
(Continued)

FOREIGN PATENT DOCUMENTS

JP 2002-63178 A 2/2002

OTHER PUBLICATIONS

Takano et al, Proceedings. Second International Conference on Creating, Connecting and Collaborating through Computing Cooking Studio: Cooking Simulation from Web Recipes Year: 2004, pp. 191 DOI Bookmark: 10.1109/C5.2004.1314397 (Year: 2004).*

(Continued)

*Primary Examiner* — Michael N Opsasnick
(74) *Attorney, Agent, or Firm* — XSENSUS LLP

(57) ABSTRACT

A recipe translation server includes circuitry which acquires quantitative recipe information which is made by converting qualitative expressions in recipe information written in a first language into quantitative expressions of numerical values. The quantitative recipe information includes nodes and edges, each node representing information on an ingredient of a dish and each edge provided between nodes and represents information on an action for cooking the dish. The circuitry acquires edge information by translating the edges written in the first language into edges written in a second language and by referring to an edge database. The circuitry then acquires node information by translating the nodes written in the first language into nodes written in the second language and by referring to a dictionary database, and generates translated quantitative recipe information corresponding to the recipe information translated into the second language.

16 Claims, 16 Drawing Sheets

(51) Int. Cl.
*G06F 40/51* (2020.01)
*G06F 40/56* (2020.01)
*G06F 40/58* (2020.01)

(56) References Cited

U.S. PATENT DOCUMENTS

| | | | |
|---|---|---|---|
| 2013/0149679 A1* | 6/2013 | Tokuda | A47J 36/321 |
| | | | 434/127 |
| 2014/0079297 A1* | 3/2014 | Tadayon | A23B 4/20 |
| | | | 382/118 |
| 2016/0371259 A1* | 12/2016 | Kohlmeier | G06Q 10/10 |
| 2018/0218462 A1* | 8/2018 | Kubo | G06Q 30/0621 |
| 2021/0110327 A1* | 4/2021 | Bellet | G06Q 10/10 |
| 2021/0212504 A1* | 7/2021 | Ohtani | G06N 20/00 |
| 2021/0216603 A1* | 7/2021 | Ohtani | G06F 16/9538 |
| 2021/0338008 A1* | 11/2021 | Ohtani | A23L 5/00 |
| 2023/0196126 A1* | 6/2023 | Kim | G06N 5/022 |
| | | | 706/46 |

OTHER PUBLICATIONS

International Search Report and Written Opinion mailed on Apr. 2, 2019, received for PCT Application PCT/JP2018/047657, Filed on Dec. 25, 2018, 6 pages including English Translation.

* cited by examiner

Fig. 3

| NODE TYPE | DESCRIPTION |
| --- | --- |
| INGREDIENT NODE | THIS NODE REPRESENTS AN INGREDIENT OF A DISH, AND A GRAPH STARTS FROM THIS NODE. |
| INTERMEDIATE NODE | THIS NODE IS CONNECTED TO EDGES IN AND OUT AND REPRESENTS AN INTERMEDIATE STATE OF A DISH. |
| DISH NODE | THIS NODE REPRESENTS A DISH AND IS A TERMINAL NODE OF A GRAPH. |
| DISPOSAL NODE | THIS NODE REPRESENTS, FOR EXAMPLE, PEELED SKINS. THIS NODE IS A KIND OF TERMINAL NODE BUT DOES NOT REPRESENT A DISH. |
| SPECIAL NODE | THIS NODE IS AN AUXILIARY NODE FOR AN APPLIANCE SUCH AS HEATING AN OVEN. |

Fig. 4

| RECIPE ID | TITLE | NODE ID/ACTION ID | PARAMETER |
|---|---|---|---|
| 0001 | SCRAMBLED EGGS | JFN01 | 3 (pcs.) |
| | | JFN02 | 10g |
| | | JE001 | |
| | | JE002 | 5min. |
| | | JMN01 | |
| | | JRN01 | |
| 0002 | BACON AND EGGS | JFN03 | 100g |
| | | JE003 | |
| | | JE004 | 5min. |
| | | JFN01 | 4 (pcs.) |
| | | JE003 | |
| | | JRN02 | |
| ⋮ | ⋮ | ⋮ | ⋮ |

Fig. 5

| NODE ID | NODE TYPE | CONTENT |
| --- | --- | --- |
| JFN01 | INGREDIENT NODE | 卵 (EGGS) |
| JFN02 | INGREDIENT NODE | 牛乳 (MILK) |
| JFN03 | INGREDIENT NODE | ベーコン (BACON) |
| JMN01 | INTERMEDIATE NODE | 卵と牛乳の混合液 (BLENDED EGGS AND MILK) |
| JRN01 | DISH NODE | スクランブルエッグ (SCRAMBLED EGGS) |
| JRN02 | DISH NODE | ベーコンエッグ (BACON AND EGGS) |
| ZN01 | DISPOSAL NODE | 卵の殻 (EGGSHELLS) |

Fig. 7

| JAPANESE ACTION ID | CONTENT | ENGLISH ACTION ID | CONTENT |
|---|---|---|---|
| JE001 | ボウルに入れる | EE001 | In bowl until blended |
| JE002 | かき混ぜる | | |
| JE003 | フライパンに入れる | EE003 | Pour in skillet |
| JE004 | 焼く(加熱する) | EE004 | bake |
| JE005 | (野菜を)切る | EE005 | cut |

Fig. 8

| RECIPE ID | TITLE | NODE ID/ACTION ID | PARAMETER |
|---|---|---|---|
| 0001 | Scrambled eggs | EFN01 | 3 |
| | | EFN02 | 10g |
| | | EE001 | |
| | | EMN01 | 5min. |
| | | ERN01 | |
| 0002 | Bacon and eggs | EFN03 | 100g |
| | | EE003 | |
| | | EE004 | 5min. |
| | | EFN01 | 4 |
| | | EE003 | |
| | | ERN02 | |
| ⋮ | ⋮ | ⋮ | ⋮ |

Fig. 12
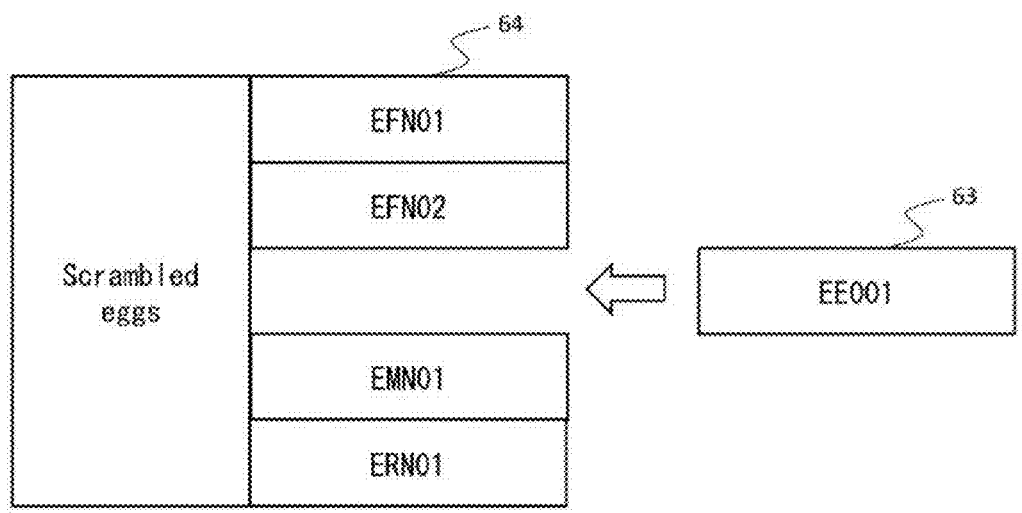
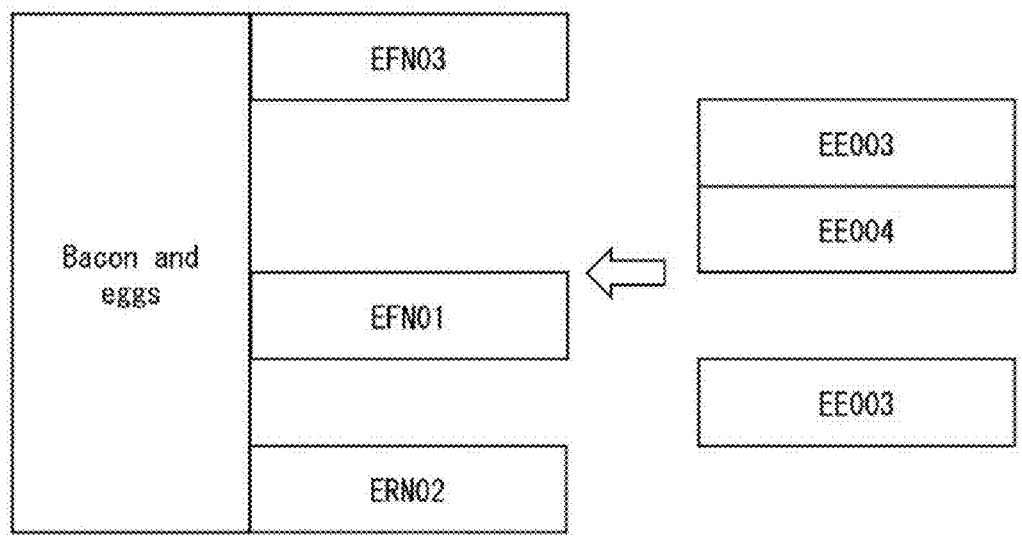

RECIPE TRANSLATION SERVER AND CONTROL METHOD FOR RECIPE TRANSLATION SYSTEM

CROSS-REFERENCE TO RELATED APPLICATION

This application is a continuation of and claims priority to International Patent Application No. PCT/JP2018/047657, filed on Dec. 25, 2018, which is incorporated by reference herein in its entirety.

TECHNICAL FIELD

The present disclosure relates to a quantitative recipe translation server, an information processing terminal, a quantitative recipe translation system, a quantitative recipe translation method, and a quantitative recipe translation program that precisely translate quantitative recipe information, which is made by converting qualitative expressions in recipe information into quantitative expressions.

BACKGROUND

In recent years, various recipes have been published through the Internet, television programs, magazines, and the like. Published recipes may each describe a cooking procedure, and ordinary users can use these recipes. For example, there is a conventional method for providing cooking recipe data as a result of a search requested by a user, over a communication network from a host apparatus storing a plurality of cooking recipe data items.

SUMMARY

The present disclosure provides a recipe translation server which includes a memory that stores recipe information, and circuitry. The circuitry is configured to acquire quantitative recipe information from the recipe information, the quantitative recipe information being made by converting qualitative expressions described in the recipe information into quantitative expressions; separate the quantitative recipe information into nodes and edges, each of the nodes representing information on ingredients of a dish, and each of the edges representing information on actions necessary for a cooking process of the dish provided between the nodes; acquire edge information made by translating the edges written in a first language into a second language; acquire node information made by translating the nodes written in the first language into the second language from; and generate translated quantitative recipe information written in the second language, by combining the edge information and the node information.

BRIEF DESCRIPTION OF THE DRAWINGS

FIG. 3 is a schematic diagram illustrating an example for explaining types of nodes illustrated in FIG. 2.

FIG. 4 is a schematic diagram illustrating an example of storage in the quantitative recipe JDB 121 illustrated in FIG. 1.

FIG. 5 is a schematic diagram illustrating an example of storage of a node segment of the quantitative recipe JDB 121 illustrated in FIG. 1.

FIG. 7 is a schematic diagram illustrating an example of storage in a translated edge DB 122.

FIG. 8 is a schematic diagram illustrating an example of storage in a quantitative recipe EDB 124 illustrated in FIG. 1.

FIG. 12 is a schematic diagram illustrating an example of combining translated nodes and edges by a combination unit 134 illustrated in FIG. 1.

DETAILED DESCRIPTION OF THE DRAWINGS

Figure 1:
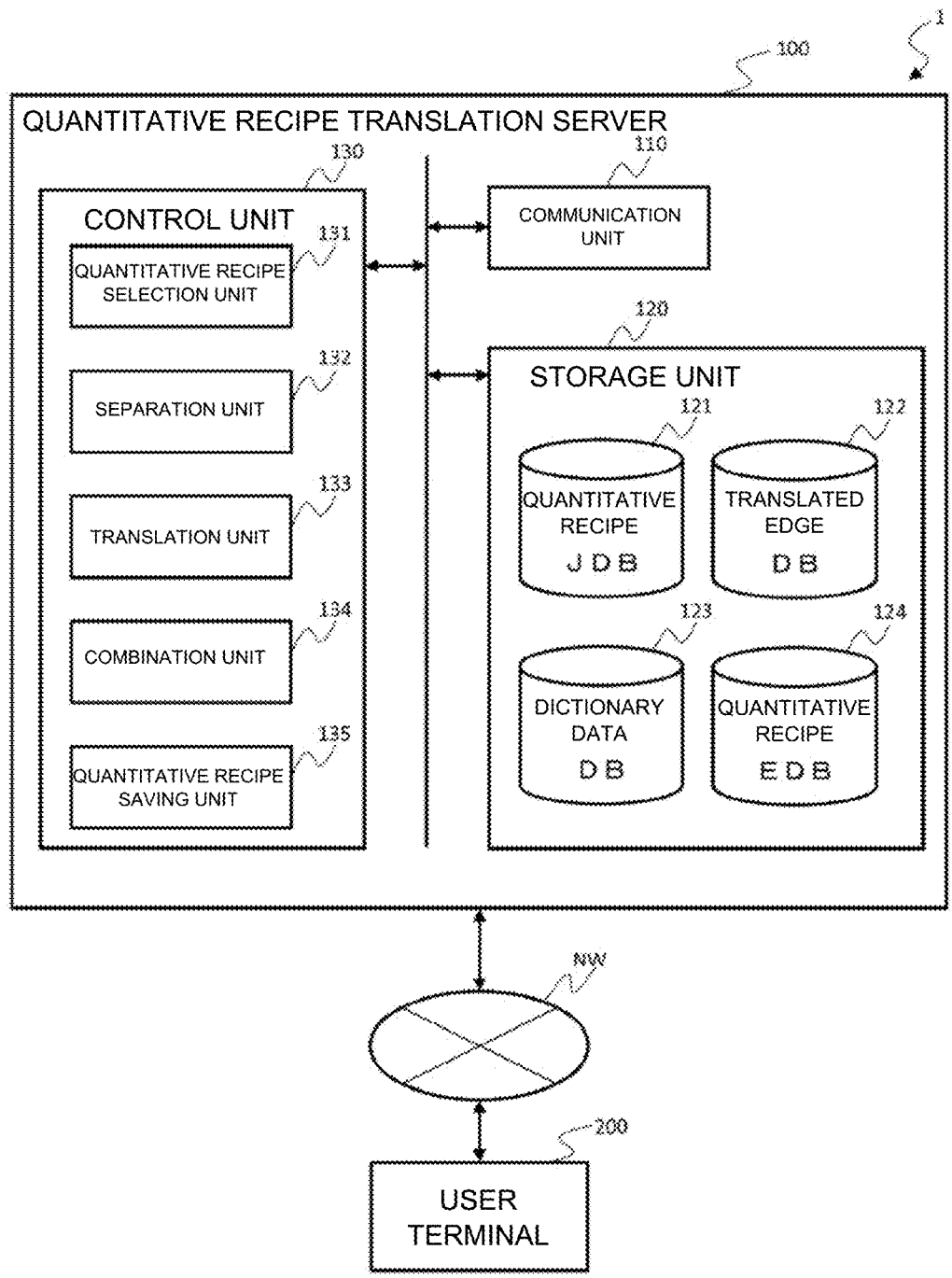
FIG. 1 is a functional block configuration diagram illustrating a quantitative recipe translation system according to an embodiment of the present disclosure.

When it is intended to translate such recipe information into another language to provide recipe information to users whose native language is the other language, such recipe information contains ambiguous expressions because the recipe information is described on the assumption that cooking is done by a human. Therefore, automatic translation of such recipe information into another language is unlikely to produce recipe information that is understood naturally by a user whose native language is the other language to perform cooking appropriately.

For that reason, in a smart kitchen technology, in which cooking is automatically performed by a so-called smart home appliance, values of quantitative descriptions in recipe information are set to a kitchen appliance to perform various kinds of cooking operations automatically in accordance with the recipe, and thus quantitative recipe information, in which qualitative expressions being ambiguous descriptions are excluded by revising them into quantitative descriptions, are used. It is considered that, when this quantitative recipe information is automatically translated into another language, the translation can be recipe information that can be understood naturally by a user whose native language is the other language to perform cooking appropriately.

It is however considered that normal automatic translation of even such quantitative recipe information often fails due to peculiarity of terms concerning a cooking process and due to cultural difference. However, because such terms concerning a cooking process are used commonly in recipe information, it is considered that associating such terms with their translated terms and using them enables precise translation. The inventors of the present disclosure have developed technology addressing these issues.

In particular, the inventors of the present disclosure have developed a quantitative recipe translation server, an information processing terminal, a quantitative recipe translation system, a quantitative recipe translation method, and a quantitative recipe translation program capable of precisely translating quantitative recipe information.

A quantitative recipe translation server according to an aspect of the present disclosure is a quantitative recipe translation server that translates quantitative recipe information into a second language based on recipe information written in a first language, the quantitative recipe information being made by converting qualitative expressions into quantitative expressions, the quantitative recipe translation server including: a quantitative recipe information storage unit configured to store the quantitative recipe information; a translated edge storage unit configured to store edges and translated edges in association with each other, the edges each representing information on an action necessary in a cooking process in the recipe information and being written in the first language, the translated edges being made by translating the edges into the second language; a separation unit that separates the quantitative recipe information into edges and nodes, the nodes each representing information on an ingredient of a dish in the recipe information; and a translation unit configured to translate the edges separated from the quantitative recipe information by replacing the edges with translated edges stored in the translated edge storage unit.

An information processing terminal according to an aspect of the present disclosure is an information processing terminal including: a translation display unit configured to receive quantitative recipe information translated into the second language from the quantitative recipe translation server stated above and to display the quantitative recipe information; and a correction transmission unit configured to accept a correction input on the quantitative recipe information translated into the second language from a user and to transmit the correction input to the quantitative recipe translation server.

A quantitative recipe translation system according to an aspect of the present disclosure is a quantitative recipe translation system including a server that translates quantitative recipe information into a second language based on recipe information written in a first language, the quantitative recipe information being made by converting qualitative expressions into quantitative expressions and a user terminal that receives an input to the server, wherein the server includes: a quantitative recipe information storage unit configured to store the quantitative recipe information; a translated edge storage unit configured to store edges and translated edges in association with each other, the edges each representing information on an action necessary in a cooking process in the recipe information and being written in the first language, the translated edges being made by translating the edges into the second language; a separation unit that separates the quantitative recipe information into edges and nodes, the nodes each representing information on an ingredient of a dish in the recipe information; and a translation unit configured to translate the edges separated from the quantitative recipe information by replacing the edges with translated edges stored in the translated edge storage unit. The user terminal includes: a translation display unit configured to receive quantitative recipe information translated into the second language from the server and to display the quantitative recipe information; and a correction transmission unit configured to accept a correction input on the quantitative recipe information translated into the second language from a user and to transmit the correction input to the quantitative recipe translation server.

A quantitative recipe translation method according to an aspect of the present disclosure is a quantitative recipe translation method for translating quantitative recipe information into a second language based on recipe information written in a first language, the quantitative recipe information being made by converting qualitative expressions into quantitative expressions, the quantitative recipe translation method including: a separation step of separating stored quantitative recipe information into edges written in the first language each representing information on an action necessary in a cooking process in the recipe information and nodes each representing information on an ingredient of a dish in the recipe information, the separation step being performed by a separation unit; and a translation step of translating the edges by reading translated edges and replacing the edges separated from the quantitative recipe information with the translated edges, the translated edges being made by translating the edges into the second language and stored in association with the edges, the translation step being performed by a translation unit.

In addition, a quantitative recipe translation program according to an aspect of the present disclosure is a quantitative recipe translation program for translating quantitative recipe information into a second language based on recipe information written in a first language, the quantitative recipe information being made by converting qualitative expressions into quantitative expressions, the quantitative recipe translation program causing an electronic computer to execute: a separation step of separating stored quantitative recipe information into edges written in the first language each representing information on an action necessary in a cooking process in the recipe information and nodes each representing information on an ingredient of a dish in the recipe information; and a translation step of translating the edges by reading translated edges and replacing the edges separated from the quantitative recipe information with the translated edges, the translated edges being made by translating the edges into the second language and stored in association with the edges.

According to the present disclosure, edges each representing information on an action necessary in a cooking process in the recipe information and being written in the first language and translated edges being made by translating the edges into the second language are stored in association with each other, edges are separated from quantitative recipe information, and the edges are translated by being replaced with the translated edges. This enables terms concerning a cooking process, which are peculiar expressions, to be translated precisely, thus enabling quantitative recipe information to be translated precisely by translating information on ingredients of a dish based on dictionary data for translating text written in the first language into the second language.

Further features of the present disclosure will become apparent from the following description of exemplary embodiments with reference to the attached drawings.

Embodiments of the present disclosure will be described below with reference to the drawings. The embodiments to be described below shall not be construed as unreasonably limiting the content of the present disclosure described in the claims. In addition, all of the constituent components described in the embodiment are not necessarily essential for the present disclosure.

Embodiment 1

<Configuration>

FIG. 1 is a functional block configuration diagram illustrating a quantitative recipe translation system 1 according to Embodiment 1 of the present disclosure. This quantitative recipe translation system 1 is, for example, a system that translates into another language quantitative recipe information created by converting qualitative expressions in recipe information into quantitative expressions based on recipe information posted by ordinary users, on a recipe site on which cooking recipe data is published. The quantitative recipe information translated into the other language in this manner can be understood naturally by, for example, a user whose native language is the other language and used for performing cooking by a smart home appliance or the like that accepts instructions in the other language to perform automatic cooking. Note that the present embodiment will be described along with an example in which original quantitative recipe information written in Japanese as a first language is translated into English as a second language.

The quantitative recipe translation system 1 includes a quantitative recipe translation server (server) 100, a user terminal (information processing terminal) 200, and a network NW. The quantitative recipe translation server 100 and the user terminal 200 are interconnected over the network NW. The network NW is a communication network used for communication and is made up of a communication network such as the Internet, an intranet, a local area network (LAN), and a wide area network (WAN).

The quantitative recipe translation server 100 is an apparatus that separates quantitative recipe information, which is created by converting qualitative expressions in recipe information into quantitative expressions, into edges each representing information on an action necessary in a cooking process in the recipe information and nodes each representing information on an ingredient of a dish in the recipe information, and translates the edges and the nodes based on different respective databases, so as to translate the quantitative recipe information into English; the quantitative recipe translation server 100 is configured as, for example, a server apparatus that provides various Web services. Note that the server apparatus is not limited to a server apparatus operating alone; the server apparatus may be configured as a distributed server system, which performs collaborative operation through communication over the network NW or may be configured as a so-called cloud server.

The user terminal 200 is a device with which a user selects a piece of quantitative recipe information intended to be translated by the quantitative recipe translation server 100, from among pieces of recipe information for which pieces of quantitative recipe information have been already created; the user terminal 200 is configured as, for example, an information processing device such as a personal computer and a tablet terminal. The user terminal 200 is, for example, a terminal used by an ordinary user who posts recipe information on a recipe site or the like.

For example, the quantitative recipe translation server 100 is a web server accepting posts of pieces of recipe information from users and publishing them on a website and accepts a post from the user terminal 200. In addition, qualitative expressions in the posted pieces of recipe information are converted into quantitative expressions by the quantitative recipe translation server 100 or another server apparatus automatically or under a user's direction, by which the pieces of recipe information are converted into pieces of quantitative recipe information.

The quantitative recipe translation server 100 includes a communication unit 110, a storage unit 120, and a control unit 130. In an exemplary implementation, quantitative recipe translation server 100 and any of communication unit 110, storage unit 120 and control unit 130 are implemented using circuitry or processing circuitry which includes general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The communication unit 110 is a communication interface for performing wired or wireless communication with the user terminal 200 over the network NW, and the communication is performed under a communications protocol such as TCP/IP (Transmission Control Protocol/Internet Protocol), for example. In communication for posting recipe information with the user terminal 200 that is authenticated through membership registration or the like, the communication unit 110 performs encrypted communication under an encryption system such as SSL (Secure Sockets Layer) and TLS (Transport Layer Security). The storage unit 120 is for storing programs for executing various kinds of control processing and functions of the control unit 130, input data, and the like and includes a random access memory (RAM), a read only memory (ROM), or the like. The storage unit 120 also stores a quantitative recipe JDB (quantitative recipe information storage unit) 121, a translated edge DB (translated edge storage unit) 122, a dictionary data DB 123, and a quantitative recipe EDB 124. Additionally, the storage unit 120 temporarily stores data obtained by communication with the user terminal 200 and data generated in processes to be described later.

The quantitative recipe JDB 121 stores Japanese quantitative recipe information, which is created by converting recipe information written in Japanese. The quantitative recipe information is information made by converting qualitative expressions in recipe information posted by a user into quantitative expressions, for example. The quantitative expressions are expressions using numerical values without ambiguous expressions; specific examples of the quantitative expressions include "豚肉を200　度に温めたオーブンで20分焼く(roast pork in the oven at 200 degrees for 20 minutes)", "塩3 g (3 g of salt)", "じゃがいもを出力600ワットの電子レンジで5分温める (heat potatoes with a 600-watt power microwave oven for 5 minutes)", and the like. The quantitative recipe information is expressed in a form of, for example, a graph that includes a plurality of nodes each representing information on an ingredient of a dish and edges each provided between nodes and each representing information on an action necessary in a cooking process, which will be described later in detail.

Note that, for example, the quantitative recipe JDB 121 stores node IDs for identifying nodes constituting quantitative recipe information and action IDs for identifying edges as the Japanese quantitative recipe information. In addition, contents indicated by the node IDs and the action IDs are stored in another segment. This manner of storage is intended for normalization of data to save the entire amount of storage used for data; however, actual contents of the nodes and the edges may be stored as the quantitative recipe information, or separate databases may be built for storing the nodes and the edges separately.

The translated edge DB 122 stores edges written in Japanese, which constitute quantitative recipe information, and translated edges obtained by translating the edges into English, with the translated edges being associated with the edges written in Japanese. The translated edge DB 122 is used for translating edges in quantitative recipe information stored in the quantitative recipe JDB 121 into English. At this time, relationships between the edges in Japanese and the translated edges in English are not necessarily one-to-one relationships; a plurality of edges in Japanese may be associated with one translated edge in English, or one edge in Japanese may be associated with a plurality of translated edges in English. This is because expressions concerning cooking can be either simple or complex due to difference of normally used cookware among countries or territories, cultural difference, or the like.

The dictionary data DB 123 stores dictionary data used for translating Japanese text into English text. The dictionary data DB 123 is used for translating nodes in quantitative recipe information stored in the quantitative recipe JDB 121 into English. The dictionary data includes a database storing word-base translations between Japanese and English, a machine translation dictionary, a bilingual corpus, and the like.

The quantitative recipe EDB 124 stores quantitative recipe information written in English. The quantitative recipe information written in English is information made by translating quantitative recipe information written in Japanese stored in the quantitative recipe JDB 121 into English by the quantitative recipe translation server 100, and therefore, pieces of quantitative recipe information written in English stored in the quantitative recipe EDB 124 are stored being associated with pieces of Japanese quantitative recipe information in the quantitative recipe JDB 121. Pieces of English quantitative recipe information are the same as pieces of Japanese quantitative recipe information in that they are each constituted of a plurality of nodes and edges provided between the nodes.

The control unit 130 controls overall operation of the quantitative recipe translation server 100 by executing programs stored in the storage unit 120 and includes a CPU (Central Processing Unit), a GPU (Graphics Processing Unit), or the like. The control unit 130 includes, as its functions, a quantitative recipe selection unit 131, a separation unit 132, a translation unit 133, a combination unit 134, and a quantitative recipe saving unit 135. The quantitative recipe selection unit 131, the separation unit 132, the translation unit 133, the combination unit 134, and the quantitative recipe saving unit 135 are activated by a program stored in the storage unit 120 and executed by the quantitative recipe translation server 100.

The quantitative recipe selection unit 131 selects a piece of quantitative recipe information to be translated into English. The selection of a piece of quantitative recipe information is performed by a user selecting, with an operation on the user terminal 200, a piece of quantitative recipe information intended to be translated into English from among pieces of recipe information for which pieces of quantitative recipe information have been already created. As another kind of processing, the quantitative recipe selection unit 131 extracts pieces of recipe information that match a predetermined condition such as having a certain number or more of access counts and selects their pieces of quantitative recipe information as those to be translated into English.

The separation unit 132 separates the piece of quantitative recipe information that has been selected by the quantitative recipe selection unit 131 and stored in the quantitative recipe JDB 121 into edges and nodes. In a piece of quantitative recipe information stored in the quantitative recipe JDB 121, for example, nodes and edges connecting the nodes are stored hierarchically, and the separation unit 132 performs the separation by sorting them into the nodes and the edges.

The translation unit 133 translates the piece of quantitative recipe information that has been selected by the quantitative recipe selection unit 131 and stored in the quantitative recipe JDB 121 into English. Specifically, the translation unit 133 first replaces the edges separated into by the separation unit 132 by applying English translated edges stored in the translated edge DB 122. In addition, the translation unit 133 translates the nodes separated into by the separation unit 132 using the dictionary data stored in the dictionary data DB 123.

The reason for performing such processing by the translation unit 133 is as follows: edges each represent information on an action necessary in a cooking process, and terms relating to cooking processes are peculiar; therefore, translation with typical dictionary data does not necessarily enable a user whose native language is English to naturally understand the translation to perform cooking appropriately. For example, machine translation of a Japanese "フライパン" into English is "Frying pan", but this kind of cookware generally used in English-speaking countries is usually called "Skillet". Therefore, the terms relating to a cooking process, which are such peculiar expressions, are stored together with their translations in the translated edge DB 122 and are used for translation. Nodes are pieces of information on ingredients of a dish, and their translations with typical dictionary data are considered not to be unnatural translations; therefore, the nodes are translated with dictionary data stored in the dictionary data DB 123.

The combination unit 134 combines English translated edges and English nodes translated into by the translation unit 133 in an order of the original quantitative recipe information stored in the quantitative recipe selection unit 131. In this manner, quantitative recipe information is translated into English.

The quantitative recipe saving unit 135 stores the English quantitative recipe information created by combining the English translated edges and the English nodes by the combination unit 134 in the quantitative recipe EDB 124.

<Quantitative Recipe Information>

Next, quantitative recipe information will be described in detail.

Recipe information is described on the assumption that cooking is done by a human, and thus recipe information contains ambiguous expressions. For example, recipe information on "scrambled eggs" is as follows.

1. Break 3 eggs into a bowl.
2. Add milk (10 g) into the bowl and mix them.
3. Add a little bit of salt and pepper.
4. Set a skillet with a suitable amount of oil over the fire and put 3. into the skillet.
5. Cook it over low to medium heat.

This example of recipe information includes descriptions such as "a little bit of salt and pepper", "a suitable amount of oil", and "low to medium heat", and these expressions are qualitative expressions, which are understandable to a human but abstract, not being usable as it is for a smart home appliance or the like to perform cooking. Hence, qualitative expressions need to be converted into quantitative recipe information to be described below, which is expressed with quantitative expressions.

Figure 2:
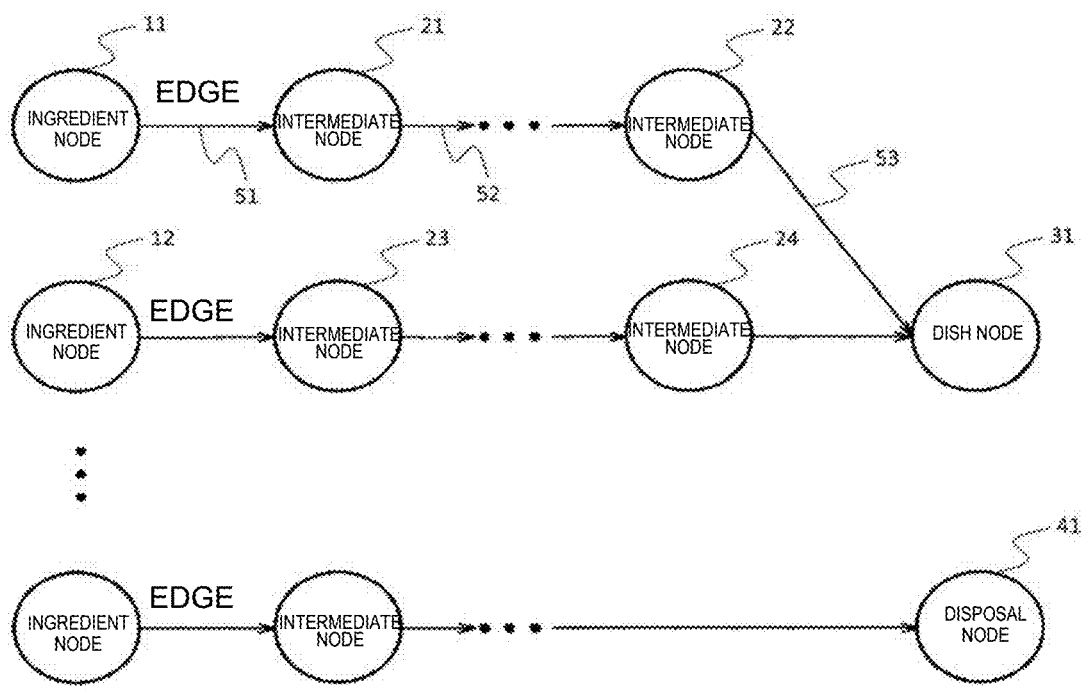
FIG. 2 is a schematic diagram illustrating an example for explaining a data structure of quantitative recipe information stored in a quantitative recipe JDB 121 illustrated in FIG. 1.

FIG. 2 is a schematic diagram illustrating an example for explaining a data structure of quantitative recipe information stored in the quantitative recipe JDB 121 illustrated in FIG. 1. FIG. 3 is a schematic diagram illustrating an example for explaining types of nodes illustrated in FIG. 2. As illustrated in FIG. 2, quantitative recipe information is expressed in a form of a graph (directed graph) including a plurality of nodes 11, 12, . . . , 21, 22, . . . and edges 51, 52, . . . between the nodes. In FIG. 2, the nodes 11, 12, . . . , 21, 22, . . . are illustrated as circles, and the edges 51, 52, . . . are illustrated as arrows.

The plurality of nodes 11, 12, . . . , 21, 22, . . . each define a state of each ingredient; for example, the nodes indicate ingredients such as "eggs" and "milk", intermediate states of the ingredients such as "blended eggs and milk", and a dish such as "scrambled eggs". Nodes are categorized into a plurality of types including an ingredient node, an intermediate node, a dish node, a disposal node, and a special node, as illustrated in FIG. 3. In the example illustrated as the graph in FIG. 2, ingredient nodes 11, 12, . . . , intermediate nodes 21, 22, 23, 24, . . . , a dish node 31, and a disposal node 41 are arranged. As illustrated in FIG. 3, the ingredient node is a starting point of a graph and represents an ingredient of a dish, the intermediate node is connected to two types of edges, IN and OUT, and represents a state of an ingredient, and the dish node and the disposal node are each an end point of a graph.

The edges 51, 52, 53, . . . each define an action necessary for a state transition between nodes and each represent a basic process that constitutes cooking, such as "cut" and "stir-fry". In the example illustrated as the graph in FIG. 2, the edge 51 is arranged as an action on the ingredient node 11, the edge 52 is arranged as an action on the intermediate node 21, and the edge 53 is arranged as an action on the intermediate node 22.

When it is intended to translate recipe information into another language, for example, English, since recipe information contains ambiguous expressions, automatic translation of the recipe information into English is unlikely to produce recipe information that is understood naturally by a user whose native language is English to perform cooking appropriately. Hence, by translating quantitative recipe information, from which qualitative expressions being ambiguous expressions are excluded, a user whose native language is English can understand the translation naturally to perform cooking appropriately.

FIG. 4 is a schematic diagram illustrating an example of storage in the quantitative recipe JDB 121 illustrated in FIG. 1. The quantitative recipe JDB 121 stores quantitative recipe information and includes a title, a node ID or an action ID, and a parameter in association with a recipe ID illustrated in FIG. 4, correspondingly to column names of the quantitative recipe JDB 121 illustrated in FIG. 4.

The recipe ID is identification information for identifying quantitative recipe information uniquely. The title is information expressing a content of a recipe straightforwardly. The node ID or the action ID is identification information for identifying a node or an edge that constitutes the quantitative recipe information and information used for acquiring a content of a node or an edge stored in a node segment or an edge segment of the quantitative recipe JDB 121, as will be described later. The parameter is information used for complementing a content of the node or the edge; examples of the parameter include a weight of an ingredient represented by the node, an execution time of an action represented by the edge, an output wattage, and the like.

FIG. 5 is a schematic diagram illustrating an example of storage of the node segment of the quantitative recipe JDB 121. The node segment of the quantitative recipe JDB 121 stores nodes constituting quantitative recipe information and includes a node type and a content in association with a node ID illustrated in FIG. 5, correspondingly to column names of the node segment of the quantitative recipe JDB 121 illustrated in FIG. 5.

The node ID is identification information for identifying a node constituting quantitative recipe information uniquely and corresponds to the node ID of the quantitative recipe information. The node type is a type of a node illustrated in FIG. 3. The content represents a content of a node; for example, in a case of a node ID "JFN01", the node is an ingredient node and stores "卵 (eggs)" as its content as illustrated in FIG. 5. In a case of a node ID "JMN01", the node is an intermediate node and stores "卵と牛乳の混合液 (blended eggs and milk)" as its content. In a case of a node ID "JRN01", the node is a dish node and stores "スクランブルエッグ (scrambled eggs)" as its content.

Figure 6:
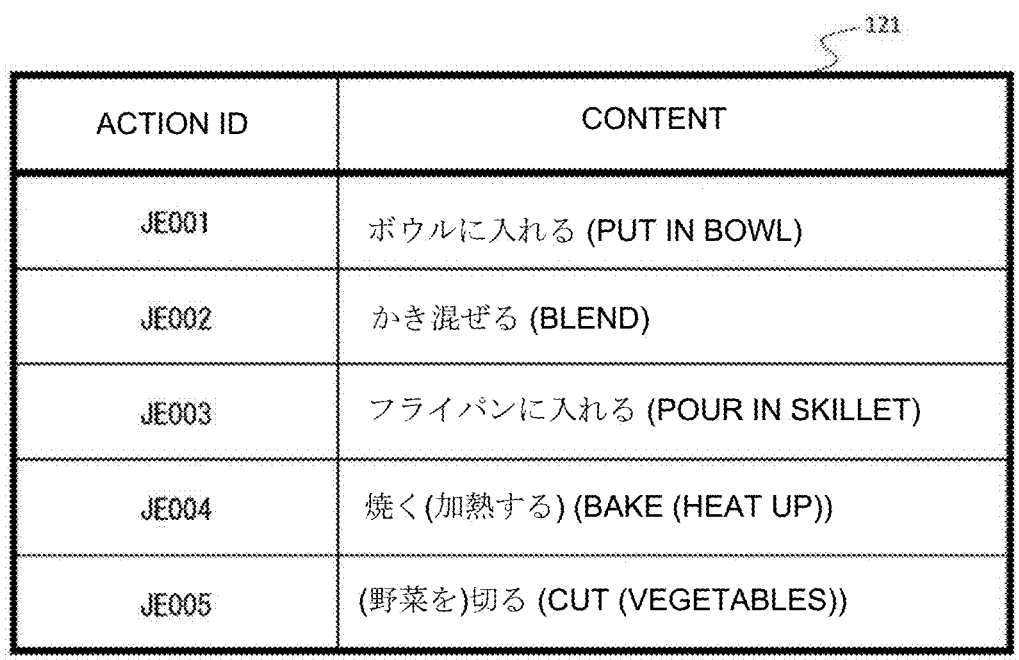
FIG. 6 is a schematic diagram illustrating an example of storage of the edge segment of the quantitative recipe JDB 121 illustrated in FIG. 1.

FIG. 6 is a schematic diagram illustrating an example of storage of the edge segment of the quantitative recipe JDB 121 illustrated in FIG. 1. The edge segment of the quantitative recipe JDB 121 stores edges constituting quantitative recipe information and includes a content in association with an action ID illustrated in FIG. 6, correspondingly to column names of the edge segment of the quantitative recipe JDB 121 illustrated in FIG. 6.

The action ID is identification information for identifying an edge constituting quantitative recipe information uniquely and corresponds to the action ID of the quantitative recipe information. The content represents a content of an edge; for example, in a case of an action ID "JE001", the edge stores "ボウルに入れる (Put in bowl)" as its content as illustrated in FIG. 6.

As described above, the data structure of the quantitative recipe information is expressed in a graph of state transitions of each ingredient rather than a graph of raw descriptions of a recipe written in a natural language. Note that an action represented by an edge does not necessarily specify an appliance to be used in the actions, which makes it possible to support various types of appliances including newly-developed appliances that will make their appearance in the future.

FIG. 7 is a schematic diagram illustrating an example of storage in the translated edge DB 122. The translated edge DB 122 stores edges written in Japanese and translated edge obtained by translating the edges into English, and in association with a Japanese action ID, a content corresponding to the Japanese action ID, an English action ID, and a content corresponding to the English action ID are included correspondingly to column names of the translated edge DB 122 illustrated in FIG. 7.

The Japanese action ID corresponds to the action ID in the quantitative recipe JDB 121. The content corresponding to the Japanese action ID represents a content of an edge that is specified by the Japanese action ID. The English action ID corresponds to an action ID in the quantitative recipe EDB 124 to be described later. The content corresponding to the English action ID represents a content of an edge that is specified by the English action ID. As illustrated in FIG. 7, a relationship between the Japanese action ID and the English action ID is not necessarily one to one. For example, Japanese action IDs "JE001" and "JE002" correspond to an English action ID "EE001". Further, a Japanese action ID corresponding to a plurality of English action IDs may be stored, and different numbers of Japanese action IDs and English action IDs may be stored correspondingly to one another.

FIG. 8 is a schematic diagram illustrating an example of storage in the quantitative recipe EDB 124 illustrated in FIG. 1. The quantitative recipe EDB 124 stores quantitative recipe information written in English and includes a title, a node ID or an action ID, and a parameter in association with a recipe ID illustrated in FIG. 8, correspondingly to column names of the quantitative recipe EDB 124 illustrated in FIG. 8.

The recipe ID is identification information for identifying a piece of quantitative recipe information uniquely and corresponds to the recipe ID of the quantitative recipe JDB 121. The title is information expressing a content of a recipe straightforwardly and is a translation of a title in the quantitative recipe JDB 121. The node ID or the action ID is identification information for identifying a node or an edge constituting quantitative recipe information. The parameter is information used for complementing a content of the node or the edge.

<Process Flow>

Figure 9:
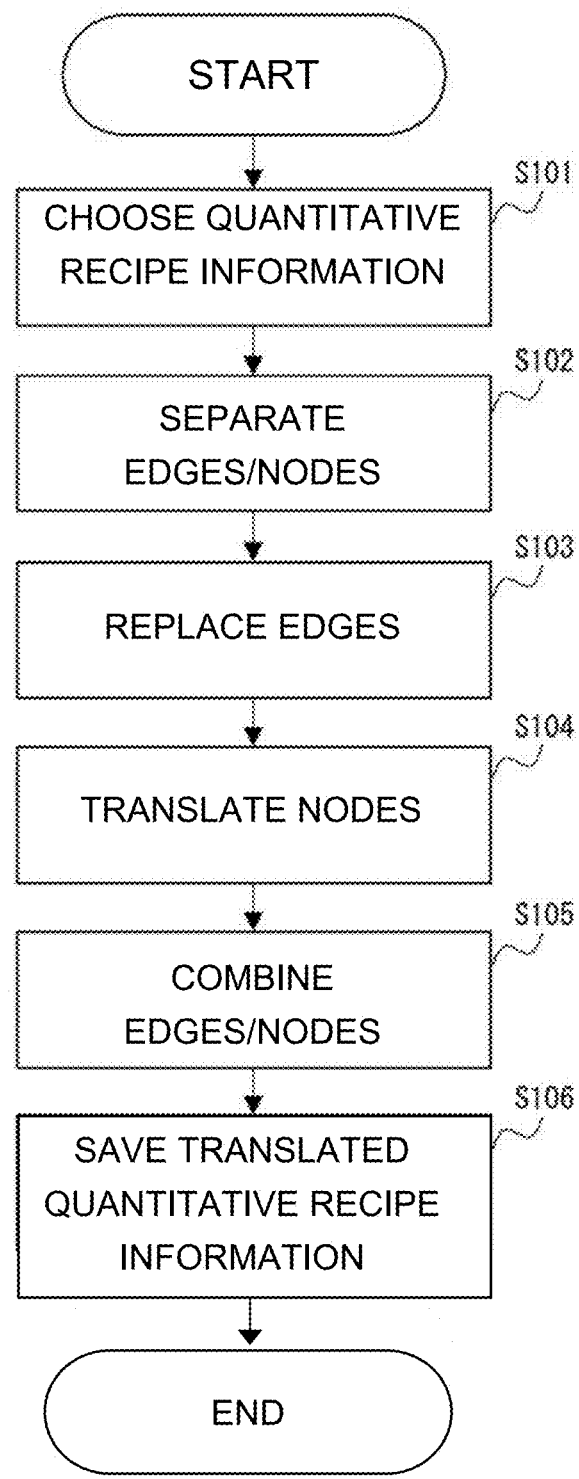
FIG. 9 is a flowchart illustrating operation of a quantitative recipe translation server 100 illustrated in FIG. 1.

With reference to FIG. 9, an example of a process flow of a quantitative recipe translation method performed by the quantitative recipe translation server 100 of the quantitative recipe translation system 1 will be described. FIG. 9 is a flowchart illustrating operation of the quantitative recipe translation server 100 illustrated in FIG. 1.

As a process of step S101, for example, when a user selects a piece of quantitative recipe information intended to be translated into English via the user terminal 200, the quantitative recipe selection unit 131 selects the piece of quantitative recipe information as a piece of quantitative recipe information to be translated into English. Alternatively, the quantitative recipe selection unit 131 extracts pieces of recipe information that match a predetermined condition such as having a certain number or more of access counts and selects their pieces of quantitative recipe information as those to be translated into English.

As a process of step S102, the separation unit 132 separates the piece of quantitative recipe information that has been selected in step S101 and stored in the quantitative recipe JDB 121 into edges and nodes.

Figure 10:
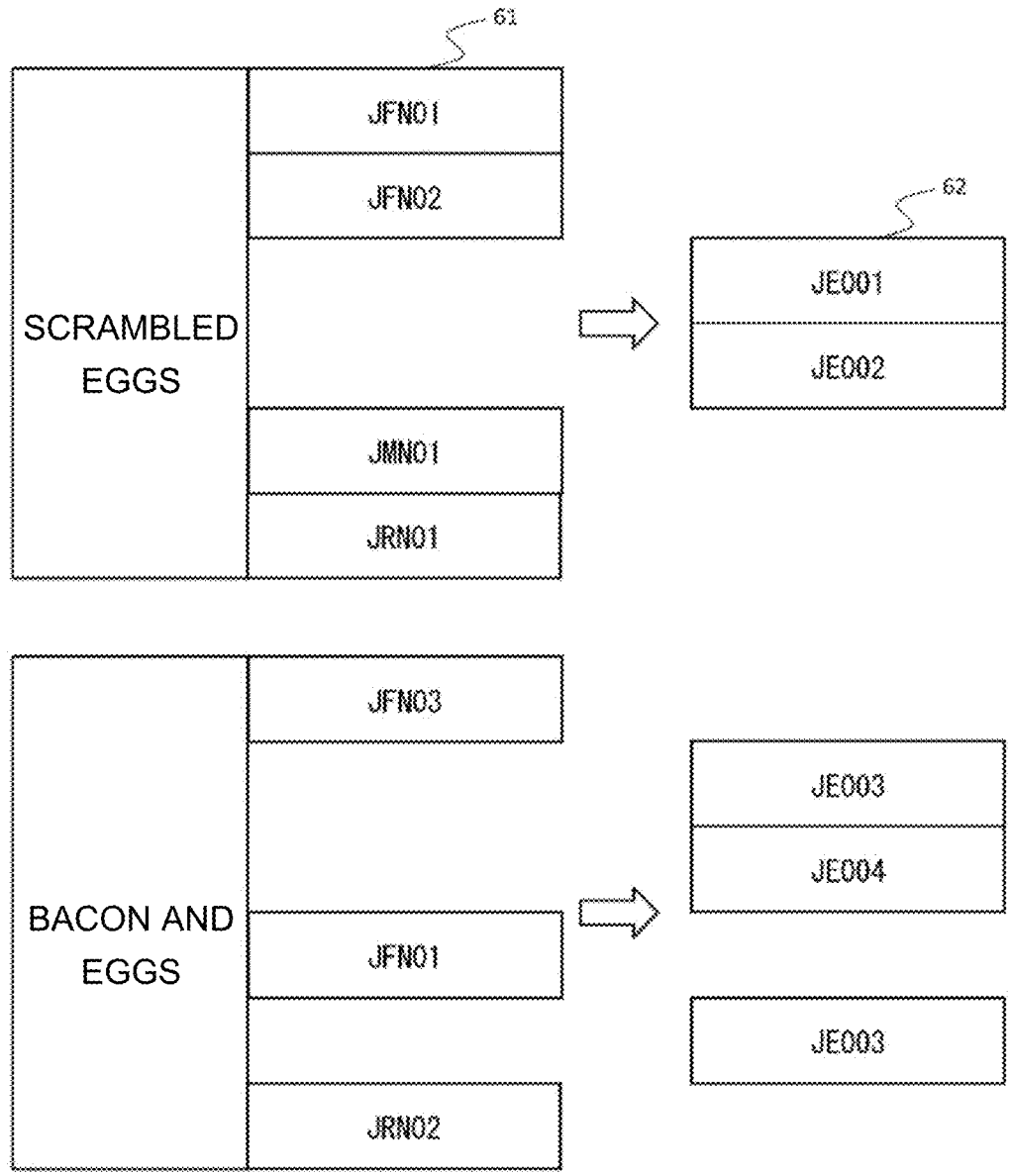
FIG. 10 is a schematic diagram illustrating an example of separation into nodes and edges by a separation unit 132 illustrated in FIG. 1.

FIG. 10 is a schematic diagram illustrating an example of separation into nodes and edges by the separation unit 132 illustrated in FIG. 1. FIG. 10 illustrates, as an example, separation of a piece of quantitative recipe information with a recipe ID "0001" and a title "スクランブルエッグ (Scrambled eggs)" and a piece of quantitative recipe information with a recipe ID "0002" and a title "ベーコンエッグ (Bacon and eggs)" illustrated in FIG. 4 into nodes and edges. In the piece of quantitative recipe information with the recipe ID "0001", nodes "JFN01", "JFN02", "JMN01", "JRN01" are registered as nodes 61, and edges "JE001" and "JE002" are registered as edges 62. From this state, the piece of quantitative recipe information is separated into the nodes 61 and the edges 62. The piece of quantitative recipe information with the recipe ID "0002" is also separated into nodes "JFN03", "JFN01", and "JRN02" as nodes 61 and edges "JE003", "JE004", and "JE003" as edges 62.

As a process of step S103, the translation unit 133 applies translated edges written in English stored in translated edge DB 122 to the edges separated into in step S102 to replace the edges.

Figure 11:
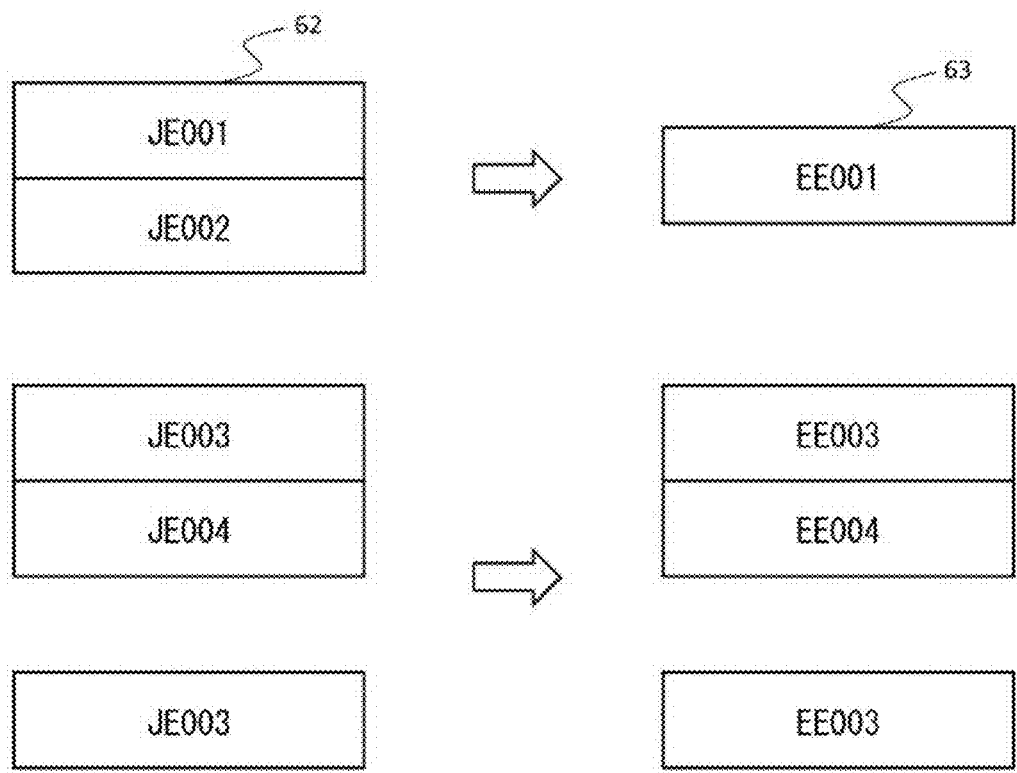
FIG. 11 is a schematic diagram illustrating an example of replacement of edges by a translation unit 133 illustrated in FIG. 1.

FIG. 11 is a schematic diagram illustrating an example of the replacement of the edges by the translation unit 133 illustrated in FIG. 1. FIG. 11 illustrates, as an example, how a translated edge written in English is applied to the edges 62 illustrated in FIG. 10. Searching the translated edge DB 122 for translated edges corresponding to the edges 62 "JE001", "JE002", "JE003", and "JE004" shows that, as illustrated in FIG. 7, an English action ID corresponding to Japanese action IDs "JE001" and "JE002" is "EE001", and an English action ID corresponding to a Japanese action ID "JE003" is "EE003", and an English action ID corresponding to a Japanese action ID "JE004" is "EE004". Edges indicated by these English action IDs are replaced with as translated edges 63 as illustrated in FIG. 11. Note that FIG. 11 illustrates two "JE003" of the edges 62; duplicate edges like these may be merged together.

As a process of step S104, the translation unit 133 translates the nodes separated into in step S102 using the dictionary data stored in the dictionary data DB 123. As illustrated in FIG. 5, nodes represented as words or phrases are translated with the dictionary data.

As a process of step S105, the combination unit 134 combines the translated edges replaced with in step S103 and the nodes translated into English in step S104. At this time, the translated edges and the English nodes are combined together in an order of the original quantitative recipe information stored in the quantitative recipe selection unit 131.

FIG. 12 is a schematic diagram illustrating an example of combining the translated nodes and edges by the combination unit 134 illustrated in FIG. 1. FIG. 12 illustrates, as an example, how the nodes 61 illustrated in FIG. 10 are translated into English nodes 64, to which the translated edges 63 illustrated in FIG. 11 are applied. The nodes in the piece of quantitative recipe information with the recipe ID "0001" illustrated in FIG. 4 are translated into the English nodes 64 and arranged in an order of "EFN01", "EFN02", "EMN01", and "ERN01". In between a node 64 "EFN02" and a node 64 "EMN01", "EE001" is applied as a translated edge 63 that corresponds to "JE001" and "JE002" registered as the edges 62. For the piece of quantitative recipe information with the recipe ID "0002", similarly, English nodes 64 are arranged in an order of "EFN03", "EFN01", and "ERN02", "EE003" and "EE004" are applied as translated edges 63 that correspond to "JE003" and "JE004" registered as the edges 62.

As a process of step S106, the quantitative recipe saving unit 135 stores the English quantitative recipe information created by combining the English translated edges and the English nodes in step S105 in the quantitative recipe EDB 124. In this manner, Japanese quantitative recipe information is translated into English.

Advantageous Effect

As described above, in the quantitative recipe translation server, the information processing terminal, the quantitative recipe translation system, and the quantitative recipe translation method according to the present embodiment, the translated edge storage unit stores edges written in Japanese and translated edges obtained by translating the edges written in Japanese into English, the separation unit separates edges from quantitative recipe information, and the translation unit translates the edges by replacing the edge with translated edges. This enables terms concerning a cooking process, which are peculiar expressions, to be translated precisely, thus enabling quantitative recipe information to be translated precisely.

Moreover, the translation unit translates nodes based on the dictionary data for translation from Japanese into English, and edges are translated by being replaced with translated edges. Thus, nodes, which are less likely to be mistranslated, are translated with an existing database or the like, and edges are translated with the translated edge storage unit, which prevents the translated edge storage unit from becoming a huge bilingual table, enabling quantitative recipe information to be translated efficiently.

Moreover, in the translated edge storage unit, relationships between the edges in Japanese and the translated edges in English are not always one-to-one relationships, and a plurality of edges in Japanese are stored in association with one translated edge in English, or one edge in Japanese is stored in association with a plurality of translated edges in English. This can deal with difference in expression caused by difference of normally used cookware among countries or territories, cultural difference, or the like.

Embodiment 2

Figure 13:
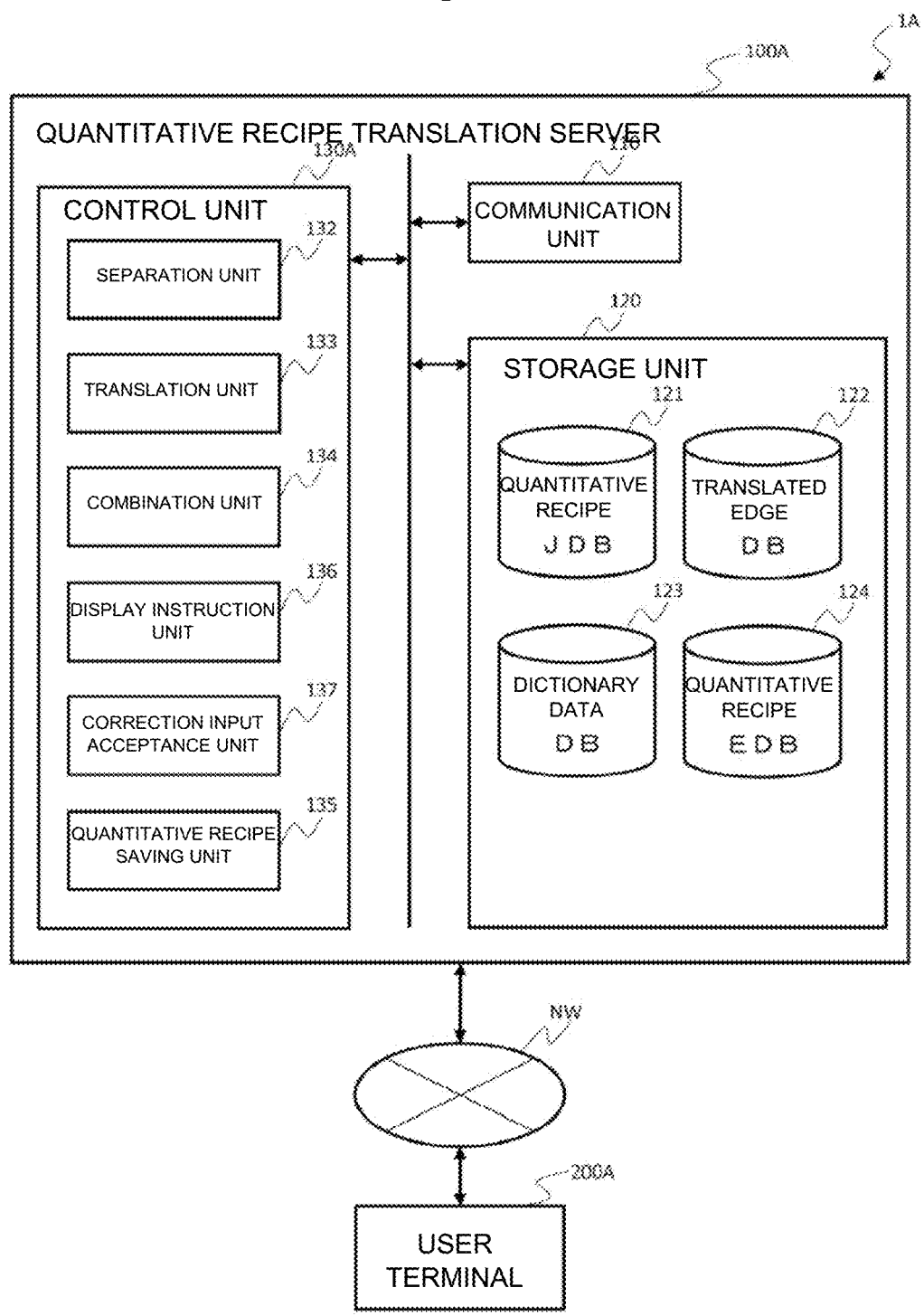
FIG. 13 is a functional block configuration diagram illustrating a quantitative recipe translation system according to an embodiment of the present disclosure.

FIG. 13 is a functional block configuration diagram illustrating a quantitative recipe translation system 1A according to Embodiment 2 of the present disclosure. The quantitative recipe translation system 1A includes a quantitative recipe translation server (server) 100A, a user terminal (information processing terminal) 200A, and a network NW. The quantitative recipe translation server 100A is the same as the quantitative recipe translation server 100 according to Embodiment 1 in that quantitative recipe information is translated into English in such a manner as to separate quantitative recipe information into edges and nodes and translate the edges and nodes based on different databases but is different from the quantitative recipe translation server 100 according to Embodiment 1 in that a display instruction unit 136 and a correction input acceptance unit 137 are provided as functions of the control unit 130.

The present embodiment is directed to enable a user to make a correction input about quantitative recipe information that is translated by the quantitative recipe translation server 100A. Therefore, there is provided a function of displaying translated quantitative recipe information stored in the quantitative recipe EDB 124 on a user terminal 200A and accepting a correction input made on the user terminal 200A.

In response to an operation on the user terminal 200A, the display instruction unit 136 transmits quantitative recipe information on which a user makes a correction via a communication unit 110 to the user terminal 200A to cause the user terminal 200A to display the quantitative recipe information. The quantitative recipe information to display includes, for example, Japanese and English pieces of quantitative recipe information that are stored in the quantitative recipe JDB 121 and the quantitative recipe EDB 124, respectively. The Japanese piece of quantitative recipe information stored in the quantitative recipe JDB 121 is for comparison in editing, and the English piece of quantitative recipe information stored in the quantitative recipe EDB 124 is to be edited.

The correction input acceptance unit 137 accepts a correction input on the translated piece of quantitative recipe information that is made by a user from the user terminal 200A. When the English piece of quantitative recipe information displayed on the display instruction unit 136 is corrected by the user operating the user terminal 200A, the correction input is transmitted from the user terminal 200A, and the correction input acceptance unit 137 accepts the correction input via the communication unit 110. The accepted piece of quantitative recipe information is updated with and stored in the quantitative recipe EDB 124.

Figure 14:
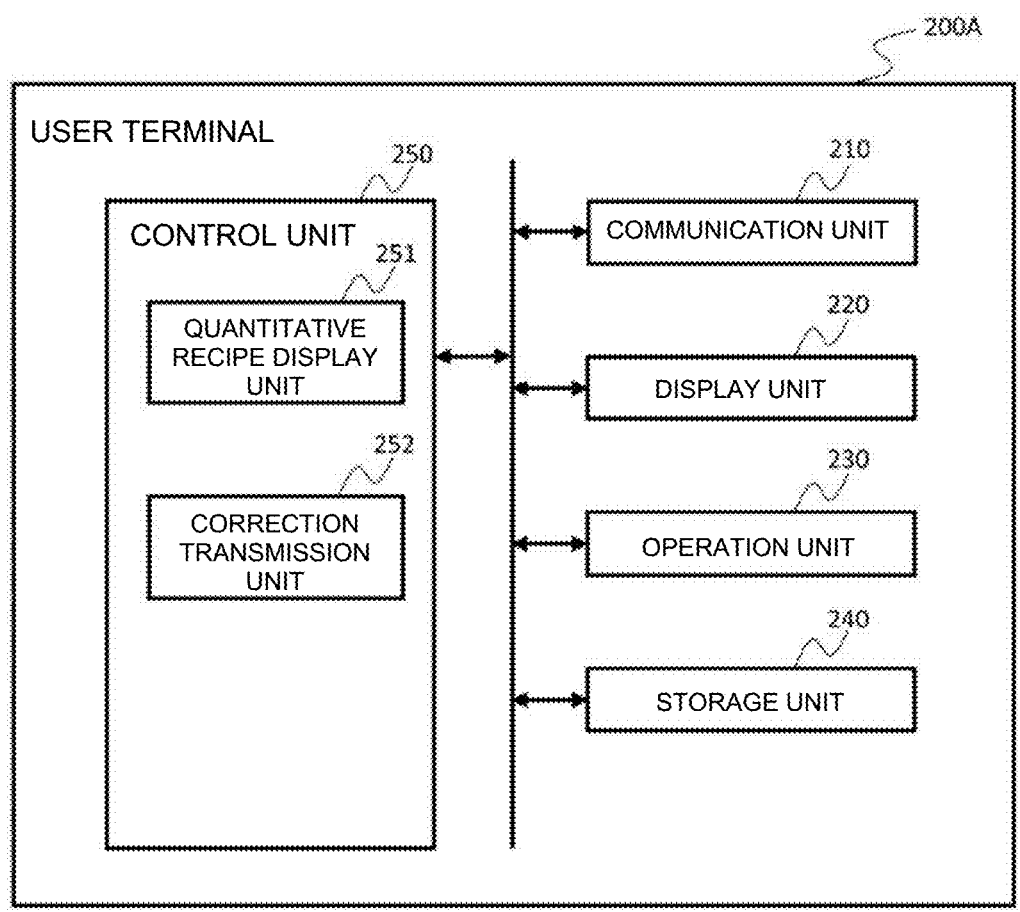
FIG. 14 is a functional block configuration diagram of a user terminal 200A illustrated in FIG. 13.

FIG. 14 is a functional block configuration diagram of the user terminal 200A illustrated in FIG. 13. The user terminal 200A includes a communication unit 210, a display unit 220, an operation unit 230, a storage unit 240, and a control unit 250. The user terminal 200A is the same as the user terminal 200 according to Embodiment 1 in that the user terminal instructs the quantitative recipe translation server 100 to perform operation but is different from the user terminal 200 according to Embodiment 1 in that a quantitative recipe display unit 251 and a correction transmission unit 252 are provided as functions of the control unit 250.

The communication unit 210 is a communication interface for performing wireless communication with the quantitative recipe translation server 100A over the network NW, and the communication is performed under a communications protocol such as TCP/IP, for example.

The display unit 220 is a user interface used for displaying a content of an operation input by the user and a content transmitted from the quantitative recipe translation server 100 and includes a liquid crystal display or the like.

The operation unit 230 is a user interface used by a user to input an instruction of an operation and includes a keyboard, a mouse, and the like.

The storage unit 240 is for storing programs for executing various kinds of control processing and functions of the control unit 250, input data, and the like and includes a RAM, a ROM, or the like. Additionally, the storage unit 240 temporarily stores data obtained by communication with the quantitative recipe translation server 100 and data generated in processes to be described later.

The control unit 250 controls overall operation of the user terminal 200 by executing programs stored in the storage unit 240 and includes a CPU, a GPU, or the like. The control unit 250 includes, as its functions, the quantitative recipe display unit 251 and the correction transmission unit 252. The quantitative recipe display unit (translation display unit) 251 and the correction transmission unit 252 are activated by a program stored in the storage unit 240 and executed by the user terminal 200.

The quantitative recipe display unit 251 displays a Japanese piece of quantitative recipe information and an English piece of quantitative recipe information in association with each other in response to an instruction from the display instruction unit 136 of the quantitative recipe translation server 100. At this time, for example, the English piece of quantitative recipe information is displayed being editable. The Japanese piece of quantitative recipe information and the English piece of quantitative recipe information are transmitted from the quantitative recipe translation server 100A, and thus the quantitative recipe display unit 251 receives and accepts them via the communication unit 210.

Figure 15:
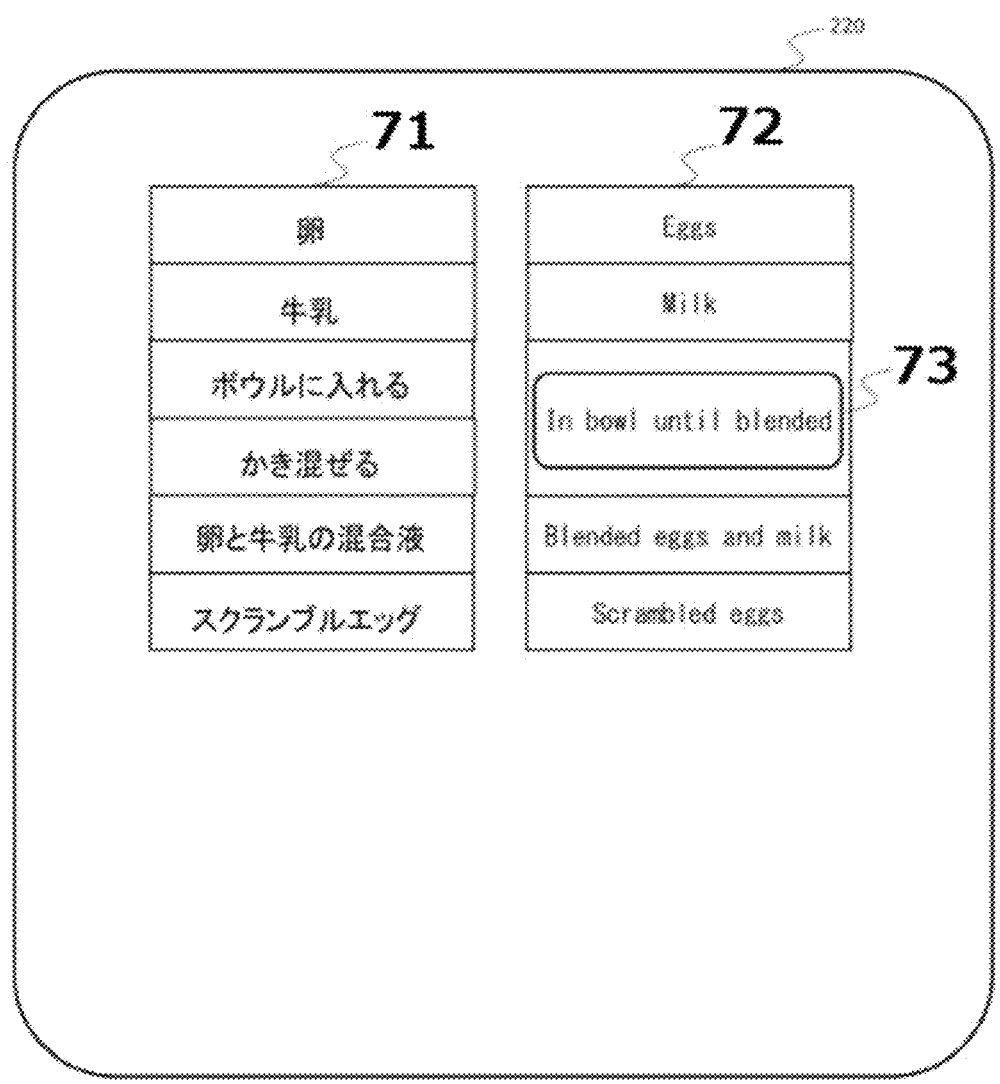
FIG. 15 is a schematic diagram illustrating an example of displaying pieces of quantitative recipe information before and after translation displayed on a display unit 220 illustrated in FIG. 14.

FIG. 15 is a schematic diagram illustrating an example of displaying pieces of quantitative recipe information before and after translation displayed on the display unit 220 illustrated in FIG. 14. As illustrated in FIG. 15, the pieces of quantitative recipe information illustrated in FIG. 4 are converted into contents in the node segment and the edge segment and displayed as Japanese pieces of quantitative recipe information 71, and the pieces of quantitative recipe information illustrated in FIG. 8 are converted into contents in the node segment and the edge segment and displayed as English pieces of quantitative recipe information 72. At this time, the Japanese pieces of quantitative recipe information 71 and the English pieces of quantitative recipe information 72 are displayed side by side in association with one another.

In addition, an area corresponding to an edge in the English pieces of quantitative recipe information 72 is displayed being editable as an editable item 73. Although only the area corresponding to the edge in the English pieces of quantitative recipe information 72 is displayed being editable as the editable item 73 in this embodiment, the English pieces of quantitative recipe information 72 as a whole may be displayed as the editable item 73. Although the Japanese pieces of quantitative recipe information 71 and the English pieces of quantitative recipe information 72 are both displayed in this embodiment, only the English pieces of quantitative recipe information 72 may be displayed.

After a user makes a correction input on the quantitative recipe information displayed by the quantitative recipe display unit 251, the correction transmission unit 252 accepts the correction input and transmits the correction input to the quantitative recipe translation server 100A via the communication unit 210. The rest of the configuration and the process flow of the quantitative recipe translation method are the same as in Embodiment 1.

According to the present embodiment, in addition to the advantageous effect of Embodiment 1 described above, the translated quantitative recipe information is made editable by the display instruction unit and the correction input acceptance unit, which enables provision of quantitative recipe information that is translated more precisely.

(Embodiment 3 (Program))

Figure 16:
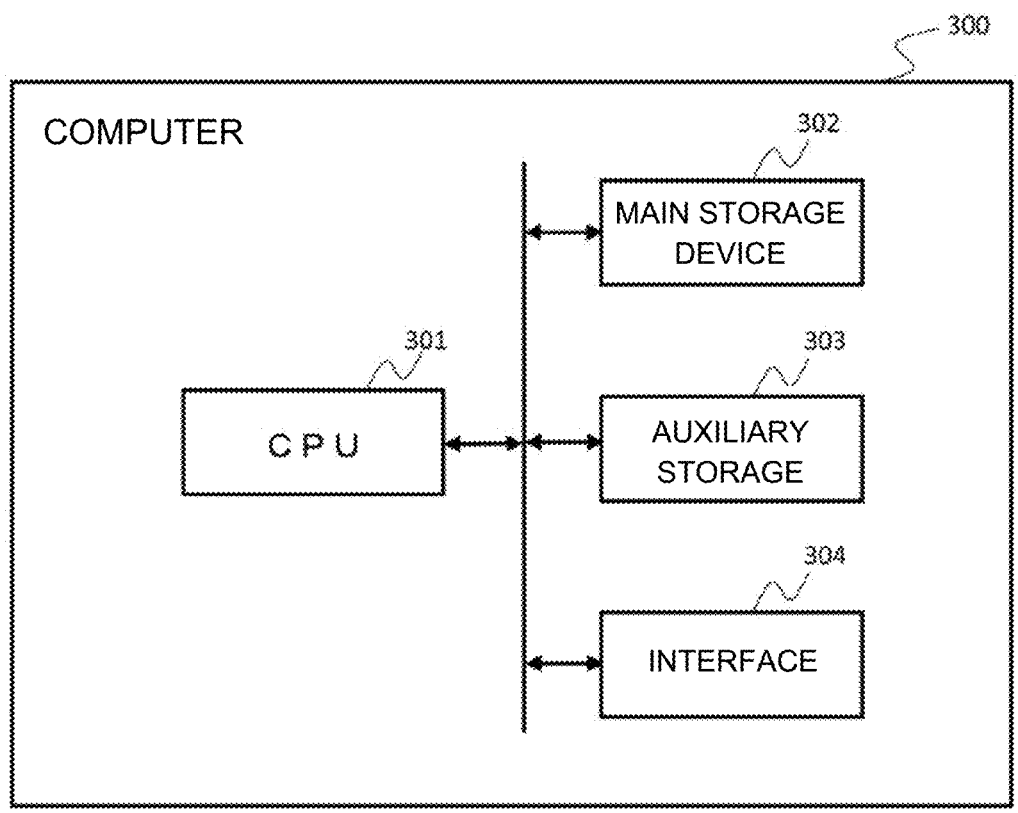
FIG. 16 is a functional block configuration diagram illustrating a computer 300 according to an embodiment of the present disclosure.

FIG. 16 is a functional block configuration diagram illustrating an example of a configuration of a computer (electronic computer) 300. The computer 300 includes a CPU 301, a main storage device 302, an auxiliary storage device 303, and an interface 304.

Here, a control program for implementing functions that constitute the quantitative recipe selection unit 131, the separation unit 132, the translation unit 133, the combination unit 134, the quantitative recipe saving unit 135, the display instruction unit 136, and the correction input acceptance unit 137 according to Embodiments 1 and 2 will be described in detail. These functional blocks are implemented in the computer 300. Operations of these constituent components are stored in the auxiliary storage device 303 in a form of a program. The CPU 301 reads the program from the auxiliary storage device 303, load the program onto the main storage device 302, and executes the process in accordance with the program. In addition, in accordance with the program, the CPU 301 reserves a storage area corresponding to the storage unit described above in the main storage device 302.

The program is specifically a quantitative recipe translation program that causes the computer 300 to translate quantitative recipe information into a second language based on recipe information written in a first language, the quantitative recipe information being made by converting qualitative expressions into quantitative expressions, wherein the quantitative recipe translation program is a control program that implements, with the computer: a separation step of separating stored quantitative recipe information into edges written in the first language each representing information on an action necessary in a cooking process in the recipe information and nodes each representing information on an ingredient of a dish in the recipe information; and a translation step of translating the edges by reading translated edges and replacing the edges separated from the quantitative recipe information with the translated edges, the translated edges being made by translating the edges into the second language and stored in association with the edges.

Note that the auxiliary storage device 303 is an example of a non-transitory tangible medium. Other examples of the non-transitory tangible medium include a magnetic disk, a magneto-optical disk, a CD-ROM, a DVD-ROM, a semiconductor memory, and the like connected via the interface 304. In addition, in a case where the program is to be distributed to the computer 300 over the network, the computer 300 that has received the distribution may load the program onto the main storage device 302 and perform the processes described above.

The program may be a program for implementing some of the functions stated above. Moreover, the program may be in a form of a so-called difference file (difference program) that implements the functions stated above in combination with other programs already stored in the auxiliary storage device 303.

Embodiments according to the disclosure are described above; these embodiments may be carried out in various other forms and may be implemented with various omissions, substitutions, and alterations. These embodiments and modifications, as well as those obtained by omission, substitution, and alteration are included in the technical scope of the claims and their equivalents.

Aspects of the present disclosure can also be realized by a computer of a system or apparatus that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

REFERENCE SIGNS LIST1, 1A QUANTITATIVE RECIPE TRANSLATION SYSTEM 100, 100A quantitative recipe translation server (server)
110 communication unit
120 storage unit
121 quantitative recipe JDB (quantitative recipe information storage unit)
122 translated edge DB (translated edge storage unit)
123 dictionary data DB
124 quantitative recipe EDB
130 control unit
131 quantitative recipe selection unit
132 separation unit
133 translation unit 134 combination unit
135 quantitative recipe saving unit
136 display instruction unit
137 correction input acceptance unit
200, 200A user terminal (information processing terminal)
210 communication unit
220 display unit
230 operation unit
240 storage unit
250 control unit
251 quantitative recipe display unit (translation display unit)
252 correction transmission unit
NW network

The invention claimed is:

1. A recipe translation server, comprising:
a memory and circuitry configured to
    acquire quantitative recipe information, wherein
        the quantitative recipe information is made by converting qualitative expressions in recipe information written in a first language into quantitative expressions of numerical values without ambiguous expressions,
        the qualitative expressions are not usable for a smart home appliance to perform cooking automatically, and
        the quantitative recipe information includes nodes and edges, each node representing information on an ingredient of a dish and each edge provided between nodes and representing information on an action necessary for a cooking process of the dish;
    separate the quantitative recipe information into the nodes and the edges;
    acquire edge information by translating the edges written in the first language into edges written in a second language different from the first language and by referring to an edge database which stores information associating the edges written in the first language with the edges written in the second language;
    acquire node information by translating the nodes written in the first language into nodes written in the second language and by referring to a dictionary database; and
    combine the edge information and the node information together in an order of the quantitative recipe information to generate translated quantitative recipe information corresponding to the recipe information translated into the second language.

2. The recipe translation server according to claim 1, wherein the circuitry is further configured to
    store one or more pieces of the edge information that represent information on actions necessary for the cooking process in the first language and in the second language, and
    acquire the edge information in the second language by replacing the edge information corresponding to the edges in the first language separated from the quantitative recipe information.

3. The recipe translation server according to claim 1, wherein
    the quantitative recipe information is expressed in a form of a graph including a plurality of the nodes and the edges between the plurality of the nodes,
    the plurality of the nodes include:
        an ingredient node, which is a starting point of the graph and represents an ingredient of a dish,
        a dish node, which is an end point of the graph and represents the dish, and
        an intermediate node, which represents a state of the ingredient on a way to the dish, and
    the edges each represent an action necessary for a state transition between the plurality of the nodes.

4. The recipe translation server according to claim 1, wherein the circuitry is further configured to select the quantitative recipe information as a target of translation, based on total access counts of the recipe information corresponding to the quantitative recipe information.

5. The recipe translation server according to claim 1, wherein the circuitry is further configured to acquire the node information made by translating the nodes written in the first language into the second language from; based on a dictionary of terms of the ingredients.

6. The recipe translation server according to claim 1, wherein the circuitry is further configured to translate the nodes based on dictionary data of the dictionary database that translates text written in the first language into the second language.

7. The recipe translation server according to claim 6, wherein the circuitry is further configured to translate the edges based on the dictionary data of the dictionary database in a case where the circuitry fails to acquire the edge information corresponding to the edges by referring to the edge database.

8. The recipe translation server according to claim 7, wherein the circuitry is further configured to
    transmit an instruction to a user terminal to display, in response to an operation on the user terminal, the translated quantitative recipe information on the user terminal, and
    accept a correction input on the translated quantitative recipe information displayed on the user terminal, the correction input being for updating the translated quantitative recipe information.

9. The recipe translation server according to claim 8, wherein the circuitry is further configured to control the user terminal to display the translated quantitative recipe information as being editable on the user terminal.

10. The recipe translation server according to claim 8, wherein the edge database stores a plurality of terms related to the cooking process of the dish to deal with difference in expressions caused by difference among countries, territories, or cultural difference where the user terminal is located.

11. The recipe translation server according to claim 10, wherein the edge database stores a first term in the first language which corresponds to a second term in the second language as one by one.

12. The recipe translation server according to claim 8, wherein the circuitry is further configured to control the user terminal to display the quantitative recipe information and the translated quantitative recipe information side by side.

13. The recipe translation server according to claim 12, wherein the circuitry is further configured to transmit, via a network, the translated quantitative recipe information to the user terminal.

14. The recipe translation server according to claim 13, wherein the displayed quantitative recipe information translated into the second language is editable via a user interface including at least one of a mouse and a keyboard of the user terminal.

15. A translation method, comprising:
acquiring quantitative recipe information, wherein
the quantitative recipe information is made by converting qualitative expressions in recipe information written in a first language into quantitative expressions of numerical values without ambiguous expressions,
the qualitative expressions are not usable for a smart home appliance to perform cooking automatically, and
the quantitative recipe information includes nodes and edges, each node representing information on an ingredient of a dish and each edge provided between nodes and representing information on an action necessary for a cooking process of the dish;
separating the quantitative recipe information into the nodes and the edges;
acquiring edge information by translating the edges written in the first language into edges written in a second language different from the first language and by referring to an edge database which stores information associating the edges written in the first language with the edges written in the second language;
acquiring node information by translating the nodes written in the first language into nodes written in the second language and by referring to a dictionary database; and
combining the edge information and the node information together in an order of the quantitative recipe information to generate translated quantitative recipe information corresponding to the recipe information translated into the second language.

16. A non-transitory computer-readable recording medium storing computer executable instructions which, when executed by a computer, cause the computer to execute a translation method comprising:
acquiring quantitative recipe information, wherein
the quantitative recipe information is made by converting qualitative expressions in recipe information written in a first language into quantitative expressions of numerical values without ambiguous expressions,
the qualitative expressions are not usable for a smart home appliance to perform cooking automatically, and
the quantitative recipe information includes nodes and edges, each node representing information on an ingredient of a dish and each edge provided between nodes and representing information on an action necessary for a cooking process of the dish;
separating the quantitative recipe information into the nodes and the edges;
acquiring edge information by translating the edges written in the first language into edges written in a second language different from the first language and by referring to an edge database which stores information associating the edges written in the first language with the edges written in the second language;
acquiring node information by translating the nodes written in the first language into nodes written in the second language and by referring to a dictionary database; and
combining the edge information and the node information together in an order of the quantitative recipe information to generate translated quantitative recipe information corresponding to the recipe information translated into the second language.

* * * * *